3,304,325
DECHLORINATION OF CHLOROACETIC ACIDS
Arthur Brian Foster, Shawinigan South, Quebec, Canada, assignor to Shawinigan Chemicals Limited, Montreal, Quebec, Canada, a corporation of Canada
No Drawing. Filed Dec. 5, 1963, Ser. No. 328,176
6 Claims. (Cl. 260—539)

This invention relates to a method for partially dechlorinating a chloroacetic acid. It further relates to a method for reducing the dichloroacetic acid content of mother liquor formed by the chlorination of acetic acid and the crystallization of monochloroacetic acid therefrom.

In one commercial method, monochloroacetic acid (MCA) is made by the reaction of elemental chlorine with acetic acid and acetic anhydride, in the presence of some acetyl chloride, which acts as a reaction initiator. The process is usually run continuously, with the mother liquor being recycled to the process after some monochloroacetic acid has been crystallized and separated from it.

In the above-described process, some dichloroacetic acid (DCA) is produced at the same time as the monochloroacetic acid. This has a much lower melting point than has MCA, so the major proportion tends to be recycled to the process, although enough is retained by the monochloroacetic acid crystals to constitute a serious level of impurity. As the DCA concentration of the mother liquor increases, the MCA crystals formed therein contain increasing percentages of DCA. To avoid this, it has been the practice to discard a portion of the mother liquor when the DCA concentration reached an objectionable level, for example 20%, thus incurring a considerable loss of valuable acetic acid and uncrystallized MCA.

Several attempts have been made to prevent DCA formation, or to convert the DCA, once formed, to MCA. Small quantities of various inhibition catalysts, for example sulfuric acid or chromium acetate, have been introduced with the reactants to reduce the rate of DCA formation. Also, mother liquor containing DCA has been hydrogenated over conventional hydrogenation catalysts such as platinum and its alloys at temperatures of 60–150° C. A very large amount of hydrogen, (approximately 4 litres per gram of mother liquor per hour at normal pressures) must be used in this method, and its high costs prohibit its use in commercial processes.

The present invention provides a simple process for partially dechlorinating a chloroacetic acid. It is especially well suited to reducing of the DCA content of the mother liquor in the previously described commercial MCA process, and so to increasing the yields which can be obtained from this process. An added advantage of the process in this latter context is that the activated charcoal utilized in the invention also decolorizes the usually light-brown mother liquor, thereby producing whiter appearing MCA products in succeeding crystallizations.

Accordingly, it is an object of the present invention to partially dechlorinate chloroacetic acids. It is a further object to provide a method for reducing the dichloroacetic acid content of the mother liquor obtained in the common commercial chlorination of acetic acid to monochloroacetic acid, and simultaneously to remove color-forming impurities from the mother liquor.

Other objects will become apparent from the description to follow.

The invention comprises a method for the reduction of the chlorine content of a chloroacetic acid by passing it in admixture with hydrogen into intimate contact with activated charcoal at a temperature in the range 140–240° C. If a mixture of chloroacetic acids is used, dehalogenation of each one will occur to some extent. For example, when a mixture of DCA, MCA and acetic acid is passed with hydrogen through charcoal according to this process, two reactions occur, both with the evolution of hydrogen chloride. DCA is reduced to MCA, and simultaneously MCA is reduced to acetic acid. The acetic acid originally present is not changed, and does not affect the other reactions taking place. The result is an increase in the amount of acetic acid present, a decrease in the amount of DCA, and either an increase or a decrease in the amount of MCA, depending upon the amounts of DCA and MCA originally present.

The reactor for carrying out the invention may be of any suitable shape, and may be heated in any suitable manner. Naturally, it should not be made from any material which would react with acetic acid or haloacetic acids at the elevated temperatures of the present process. A glass or glass-lined column packed with activated charcoal has been found to be extremely suitable. The size of the activated charcoal particles likewise does not seem to be critical, although they should be small enough to give good contact with the chloroacetic acids passed through them, and should be large enough so that they may be suitably retained on a support to facilitate separation from the treated acids.

The efficiency of reduction of chloroacetic acids with hydrogen over activated charcoal increases with increasing temperature. For commercially acceptable degrees of reduction, temperatures higher than about 140° C. should be used. The best results are obtained at temperatures greater than about 200° C., but because of materials problems, it is generally desirable to operate at temperatures below about 240° C. Thus the preferred temperature range for this process is about 200–240° C., although good results may be obtained at any temperature from 140° C. to 250° C. or higher.

In general, it is desirable to pass the chloroacetic acids to be reduced into the reactor in the vapor phase, as liquid phase operations lead to engineering difficulties such as poor contacting, column flooding, and inconvenient pressure drops. Thus a preheater is conveniently included in the system, to heat the haloacetic acids either before or after they have been admixed with hydrogen, and before they are passed into contact with the activated charcoal. The preheater can be simply a heated column, preferably filled with an inert contacting material such as berl saddles. It is not necessary to preheat the haloacetic acids to their boiling points, and conveniently they are heated merely to a temperature at which they will easily mix with the introduced hydrogen as an entrained vapor. Also in order to assure complete vaporization of the haloacetic acids, it is sometimes desirable to use an excess of hydrogen over the amount theoretically necessary for the desired reaction, or to mix the hydrogen with an inert gas such as nitrogen. The addition of an inert gas does not hinder the operation of the process, and may in some process designs lead to more efficient operation from an engineering standpoint.

The process of the invention is illustrated by the following examples. A series of initial mixtures of dichloroacetic acid, monochloroacetic acid and acetic acid (with compositions as indicated in Table 1) were passed through a 20 cm. long, 3.8 cm. diameter heat-resistant glass preheater tube packed with berl saddles. This tube was heated by means of external heating tapes to raise the temperature of the mixtures to about 150° C. Each heated mixture was then admixed with hydrogen in a gas mixing globe and passed into a 61 cm. long, 3.8 cm. diameter heat-resistant glass tubular reactor, which was packed for the different examples listed below with one of the various types of activated charcoal or with an activated charcoal berl saddle mixture, as indicated in Table 1. The activated charcoal used had a particle size range of 4.76–1.19 mm. Reaction conditions and results are shown in Tables 1 and 2 respectively.

TABLE 1.—REACTION CONDITIONS, INITIAL MIXTURE COMPOSITION

| Example | Reactor Packing | Reactor Temp., °C. | Weight, g. | AcOH, Percent | MCA, Percent | DCA, Percent | Rates of Addition | |
|---|---|---|---|---|---|---|---|---|
| | | | | | | | Initial Mixture, ml./min. | Hydrogen, l./hr.* |
| 1 | ½ berl saddles, ½ charcoal | 185 | 200.0 | 27.5 | 49.3 | 23.2 | 5.3 | 93.1 |
| 2 | ---do--- | 227 | 200.0 | 39.1 | 60.0 | 0.91 | 6.7 | 93.1 |
| 3 | ---do--- | 242 | 200.0 | 81.8 | nil | 18.2 | 4.6 | 93.1 |
| 4 | Mineral charcoal (activated) | 231 | 200.0 | 81.8 | nil | 18.2 | 4.1 | 93.1 |
| 5 | ---do--- | 198 | 200.0 | 81.8 | nil | 18.2 | 5.3 | 93.1 |
| 6 | ---do--- | 150 | 200.5 | 33.5 | 60.0 | 6.5 | 2.8 | 84.9 |
| 7 | ---do--- | 170 | 200.5 | 33.5 | 60.0 | 6.5 | 2.5 | 84.9 |
| 8 | ---do--- | 190 | 200.0 | 33.5 | 60.0 | 6.5 | 2.3 | 84.9 |
| 9 | ---do--- | 215 | 200.0 | 33.5 | 60.0 | 6.5 | 2.2 | 84.9 |
| 10 | Coconut charcoal (activated) | 150 | 200.0 | 28.4 | 64.2 | 7.4 | 2.4 | 84.9 |
| 11 | ---do--- | 210 | 200.0 | 28.4 | 64.2 | 7.4 | 3.5 | 84.9 |

*Hydrogen volumes given at 20° C., 760 mm. Hg pressure.

TABLE II.—PRODUCT YIELDS AND ANALYSES

| Example | Product Weight, g. | Mixture Composition | | | HCl Recovered, g. | Recovery by Components | | |
|---|---|---|---|---|---|---|---|---|
| | | AcOH, percent | MCA, percent | DCA, percent | | AcOH, percent | MCA, percent | DCA, percent |
| 1 | 160.0 | 24.9 | 60.8 | 14.3 | 8.78 | 72.4 | 98.5 | 49.6 |
| 2 | 158.5 | 59.6 | 40.4 | nil | 20.4 | 120.8 | 53.3 | nil |
| 3 | 171.8 | 92.8 | 7.16 | nil | 17.75 | 97.5 | | nil |
| 4 | 179.7 | 90.8 | 9.2 | nil | 9.8 | 99.7 | | nil |
| 5 | 172.4 | 84.7 | 12.5 | 2.8 | 6.8 | 89.2 | | 28.5 |
| 6 | 181.0 | 31.3 | 65.8 | 2.9 | 6.6 | 93.5 | 109.7 | 44 |
| 7 | 183.0 | 39.4 | 58.6 | 2.0 | 7.8 | 116.1 | 97.7 | 31 |
| 8 | 187.0 | 42.1 | 57.2 | 0.7 | 6.5 | 126.0 | 95.3 | 11 |
| 9 | 161.0 | 46.3 | 53.5 | 0.2 | 37.3 | 138.2 | 89.2 | 3 |
| 10 | 185.5 | 37.0 | 59.0 | 4.0 | 4.0 | 130 | 92 | 54 |
| 11 | 159.5 | 32.9 | 64.0 | 3.1 | 24.0 | 116 | 100 | 42 |

In the foregoing tables, "initial mixture" is used to designate the mixtures of chloroacetic acids fed into the preheater, and "product mixture" is used to designate the mixture of chloroacetic acids obtained from the exit of the reactor after reduction with hydrogen. "AcOH" designates acetic acid.

The product mixture was in each case visibly less highly colored than the starting mixture, although no quantitative comparisons of color were made.

Detailed analyses were carried out during Runs 1 and 5 to show as well as possible the material balance of the reaction. The results were as follows:

| | Example 1 | Example 5 |
|---|---|---|
| Reactor Temperature, °C | 185 | 198 |
| Wt. of Starting Material, g | 200.0 | 200.0 |
| Analysis of Initial Mixture by Weight, g.: | | |
| AcOH | 55.0 | 163.6 |
| MCA | 98.8 | nil |
| DCA | 46.2 | 36.4 |
| Rate of Addition of Initial Mixture, cc./min | 5.3 | 5.3 |
| Rate of Addition of H₂, m.³/hr | 0.093 | 0.093 |
| Wt. of Product, g | 160.0 | 172.4 |
| Analysis of Product Mixture by Weight, g.: | | |
| AcOH | 39.8 | 146.0 |
| MCA | 97.3 | 21.5 |
| DCA | 22.9 | 4.9 |
| Product Recovery: | | |
| Change of Wt. of Reactor Column, g | +11.3 | −6.0 |
| Wt. of HCl recovered, g | 8.78 | 6.8 |
| Formaldehyde in Product, percent | 0.05 | None detected |
| Total Weight Accounted for, g | 180.1 | 173.2 |
| Recovery (based on total weight), percent | 90.0 | 86.6 |

It will be seen from the foregoing figures that some material is adsorbed or desorbed in each run by the activated charcoal, leading to a small net change in the weight of the charcoal column. A small amount of formaldehyde is also produced in some cases, probably by the decomposition of small amounts of acetic and chloroacetic acids. Some material is lost in each run, probably due to the formation of volatile byproducts.

The foregoing descriptions and particularly the examples are set forth by way of illustration only. Many other variations and modifications thereof will be obvious to those skilled in the art, and can be made without departing from the spirit and scope of the invention herein described.

What is claimed is:

1. A process for the replacement with hydrogen of at least one atom of chlorine in a chloroacetic acid, which process comprises mixing the chloroacetic acid with hydrogen and passing the resulting mixture in the vapor phase into intimate contact with activated charcoal at a temperature in the range 140–250° C., said activated charcoal being the sole hydrogenation catalyst to contact the mixture.

2. A process as claimed in claim 1 in which the mixture of chloroacetic acid and hydrogen which is contacted with activated charcoal additionally contains acetic acid.

3. A process according to claim 1 in which the chloroacetic acid is dichloroacetic acid.

4. A process according to claim 1 in which the chloroacetic acid comprises both monochloroacetic acid and dichloroacetic acid.

5. A process according to claim 1 in which the mixture is contacted with activated charcoal at a temperature in the range 200–240° C.

6. A process according to claim 1 in which an inert gas is admixed with the chloroacetic acid and hydrogen.

References Cited by the Examiner

UNITED STATES PATENTS

| 2,671,803 | 3/1958 | Sennewald | 260—539 |
| 2,863,917 | 12/1958 | Rucker | 260—539 |
| 3,071,615 | 1/1963 | Opitz | 260—539 |

LORRAINE A. WEINBERGER, *Primary Examiner.*

LEON ZITVER, *Examiner.*

D. P. CLARKE, A. P. HALLUIN, *Assistant Examiners.*